Feb. 11, 1941.  C. L. EKSERGIAN  2,231,848
RAILWAY TRUCK
Filed March 17, 1939  2 Sheets-Sheet 1
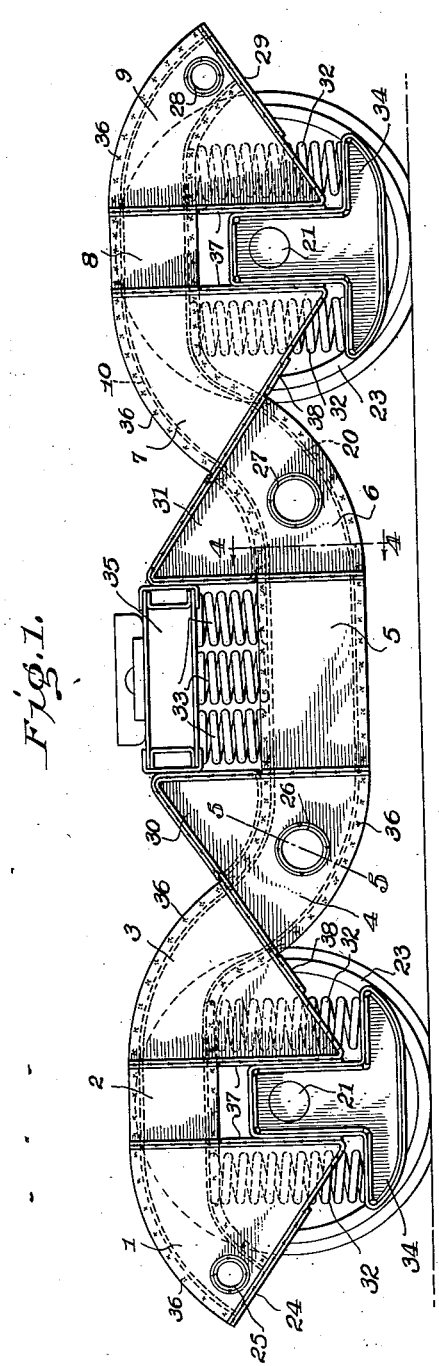
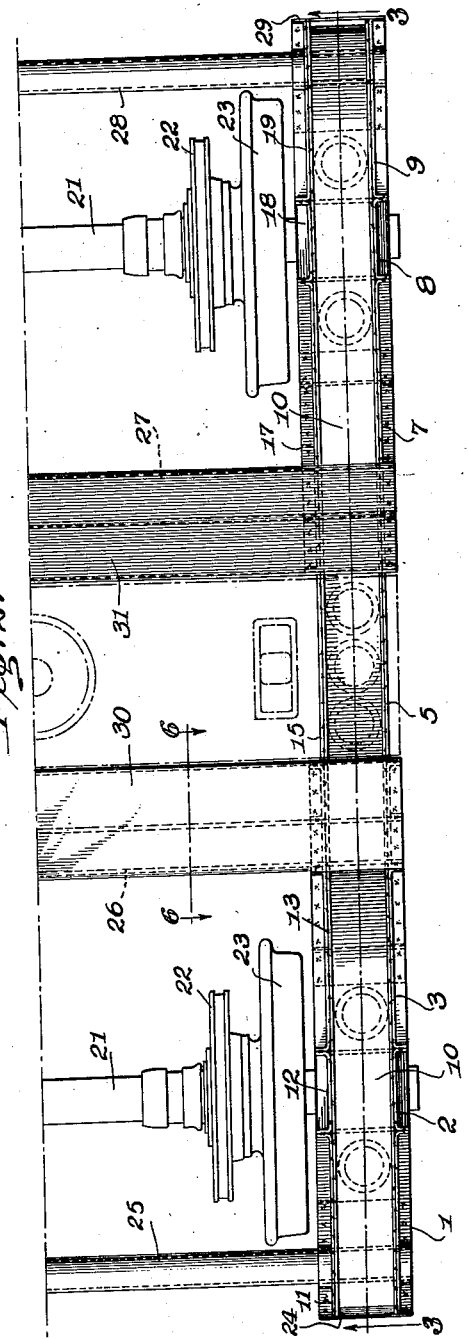
INVENTOR:
Carolus L. Eksergian
BY John P. Barbop
ATTORNEY

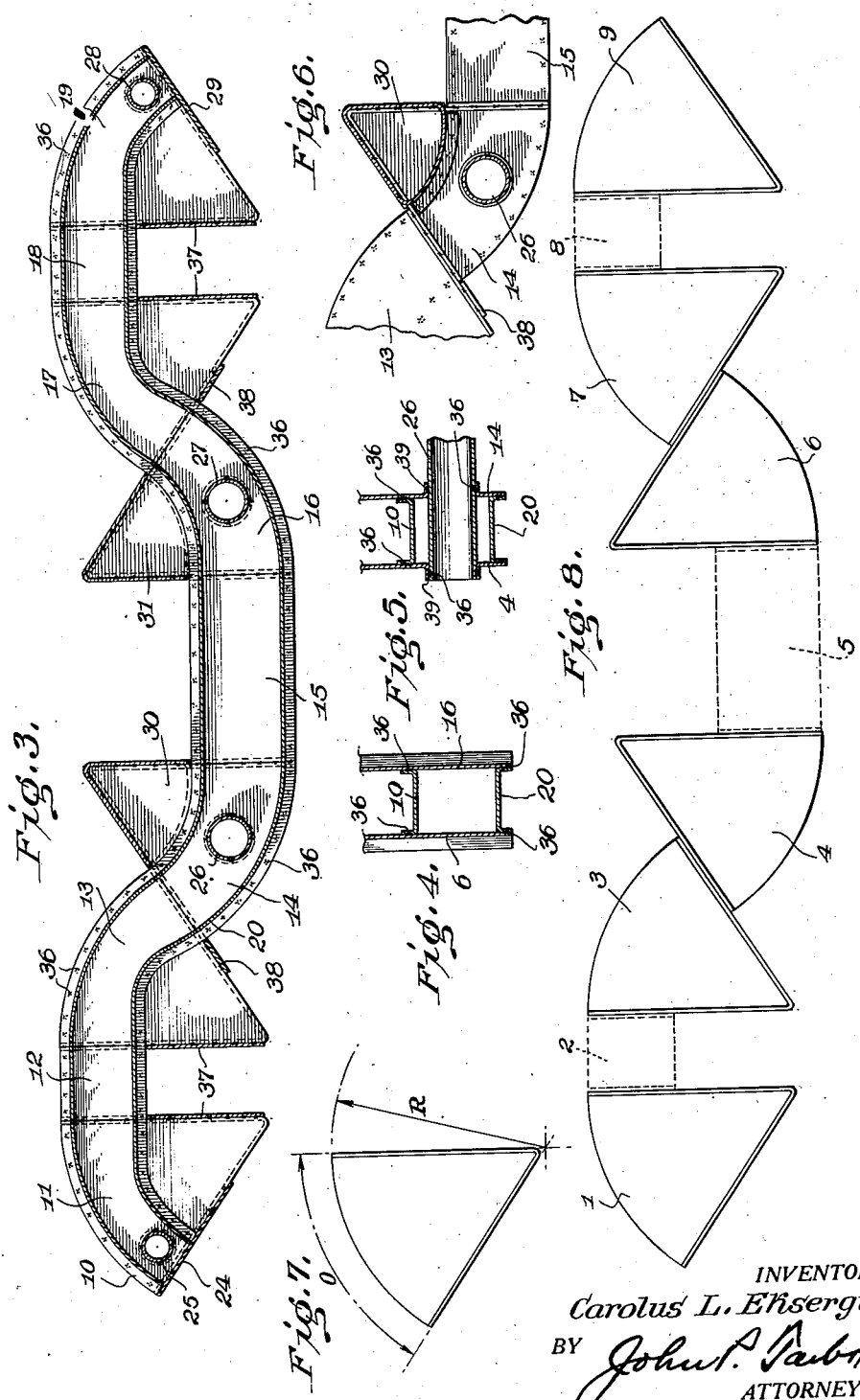

Patented Feb. 11, 1941

2,231,848

UNITED STATES PATENT OFFICE 2,231,848

RAILWAY TRUCK

Carolus L. Eksergian, Detroit, Mich., assignor to Edward G. Budd Manufacturing Co., Philadelphia, Pa., a corporation of Pennsylvania Application March 17, 1939, Serial No. 262,357

14 Claims. (Cl. 105—206)

The present invention relates to railway trucks.

An object of the invention is to simplify the fabrication of such trucks, while simultaneously making it possible to employ lighter material in their manufacture, without sacrificing strength or rigidity.

A further object is to provide a truck construction which may be fabricated of sheet material, particularly stainless steel. The truck is built up mainly of channel members and flanged flat plates which are integrally secured to one another in any suitable manner preferably by welding, for example spot welding.

Another object of the invention is to decrease the number of different shaped parts required in building up such trucks, that is, to design them so that as many duplicate parts as possible are employed, in order to simplify and cheapen the manufacture and assembly of the trucks.

While it is possible to use the principles of the invention in many different ways in designing and constructing trucks and other structures, a preferred form which is very satisfactory from the viewpoints of ease of manufacture, economy, lightness, strength, rigidity, and the like is disclosed in the accompanying drawings wherein:

Fig. 1 is a side elevation of a truck embodying the invention,

Fig. 2 is a plan view of one longitudinal half of the truck,

Fig. 3 is a longitudinal section through one side frame of the truck, the section being made on the plane indicated by the line 3—3 of Fig. 2, looking in the direction of the arrows, Fig. 4 is a fragmentary detail sectional view of a portion of the truck shown in Fig. 1, the section being made on the plane indicated by the line 4—4, Fig. 5 is a fragmentary detail sectional view of a portion of the truck shown in Fig. 1, the section being made on the plane indicated by the line 5—5, Fig. 6 is a fragmentary detail sectional view of a portion of the truck, the section being made on the plane indicated by the line 6—6 of Fig. 2, Fig. 7 is a diagrammatic representation of one of the component structural elements of the truck, and Fig. 8 is a diagrammatic representation of a truck, showing how the elements are assembled.

Referring particularly to Figs. 1, 2 and 3 it will be noted that the truck as a whole comprises two longitudinal members or box beams which are symmetrically disposed about the longitudinal center line of the truck, each of these box beams being built up of a number of pieces suitably secured together, preferably by spot welding or the like.

An upper channel member 10 extending throughout the entire length of the truck, and having its flanges directed upwardly, forms the top of the box beam while a corresponding channel member 20, having its flanges directed downwardly, forms the bottom thereof.

Flat pieces, each having flanges formed on certain edges thereof, are secured to the channel members 10 and 20 and these pieces are designated by reference characters 1 to 9 and 11 to 19 respectively. It will be noted that member 1 is sector shaped, consisting of a flat body portion having upstanding flanges on the two radial edges of the sector and that member 11 is like member 1 except that the flanges extend in the opposite direction. Members 3, 4, 6, 7, and 9 are likewise sector shaped and the corresponding oppositely located elements 13, 14, 16, 17 and 19 are similar thereto but have the flanges directed oppositely.

The flat body portions of members 1 to 9 and 11 to 19 are secured, preferably by spot welding, to the flanges of the channel members 10 and 20, these spot welds being indicated by the reference character 36 which is applied at random to certain of said welds for illustrative purposes.

Except for the flanged holes which appear in certain of the sector-shaped members 1, 3, etc., these members are identical with one another and with the corresponding elements 11, 13, etc., so that a single punch and die may be used to cut all of them, thus economizing in the machinery needed in forming the said elements and in the time required in assembling them.

Some of the pieces have holes cut therein to receive the bracing tubes 25, 26, 27 and 28 which extend transversely of the truck from the outside of one box beam to the outside of the other, as shown, and these bracing tubes pass through suitable holes formed in the sectors 1, 4, 6, and 9, as well as in the corresponding sectors 11, 14, 16, and 19. It will be seen that the sector 1 is identical in all respects with the sector 19 and the sector 9 is likewise identical with the sector 11 in all respects, so that only two differently apertured kinds of sectors are required for these two types of elements.

It will be further noted that the sectors 4, 14, 6, and 16, which are apertured to receive the tubes 26 and 27, are precisely identical with one another since the apertures for receiving said tubes are placed centrally so that only one type of sector is required to make all of these four elements. Of course, the sectors 3, 13, 7 and 17, which have no apertures therein, are also identical with one another. Thus the total number of different kinds of sectors needed is reduced to four.

Between the sectors 1 and 3 is interposed a rectangular section 2 which is actually merely a nearly square piece made of a channel section, as clearly shown in Fig. 2. It will be noted that identical pieces are employed at 2, 12, 8 and 18, thus requiring only one type of piece for these four elements. Finally, the rectangular sections 5 and 15 are identical with one another and consist merely of sections of channel shape of rectangular form in elevation, all of them being alike.

The upstanding flanges on the various sectors and rectangular elements are secured to each other, their flat parts to the channels 10 and 20, by spot welding, as indicated. This results in providing additional strength for the box beams, since the doubled flanges where they are welded together act as very effective stiffening ribs. The tubes 25, 26, 27 and 28, which are welded to the sector shaped elements through which they pass, on each side of each box beam, serve to unite the whole into a very rigid entity.

The axles 21 carrying the wheels 23 with their brake rings 22, are journaled in the axle boxes 34 and these boxes are arranged to slide vertically in pedestal guides formed beneath the channel member 20 at the locations occupied by the elements 2 and 12 on the one hand and 8 and 18 on the other hand. Suitable springs 32 resting on top of the horizontal projections of the axle boxes and supporting the channel member 20 by bearing against its web, serve to provide yieldable resilient mountings for the axles 21.

In order further to reinforce this portion of the frame, flat plates 37 may be welded against the corresponding flange portions of the sectors 1, 11, 3, 13, 7, 17, 9 and 19 as shown. End plates 24 and 29 are likewise secured to the outermost portions of the sectors 1, 11, 9 and 19 respectively, to increase the rigidity, and these plates extend inward and downward as far as possible, leaving only sufficient room for the springs 32.

Plates 38, arranged as shown, serve to tie together the members 3 and 13 on the one hand and 7 and 17 on the other hand, to increase the rigidity of the truck at these points. Tubular members 30 and 31, having a sector shaped cross section, are welded in position transversely across the truck as shown, the member 30 being secured by spot welding to the flanges of the elements 4 and 14 and the tubular member 31 being similarly welded to the members 6 and 16. It will be understood of course, that exactly the same construction is employed on the other half of Fig. 2, in other words, the truck is symmetrical about the longitudinal center line forming the top boundary of Fig. 2.

The tubes 30 and 31 of course cannot continue as tubes where they pass the members 4, 14 and 6, 16 respectively, and therefore the arcuate lower portion of each of said tubular members is cut away and merely the two upper substantially plane parts, forming the radial sides of the sector-shaped tubes, continue outward from these points and are suitably secured by spot welding to the flanges of the sectors 4, 14, 6 and 16 respectively. Between the adjacent vertical sides of the tubes 30 and 31 there is thus provided a clear space which will accommodate a bolster 35, which rests on the springs 33 and is capable of sliding vertically in its bearings.

It will be noted that all the portions which are welded are very readily accessible for such purposes and that in each instance there is formed at the weld a portion of double thickness of metal which provides additional very effective bracing, thus contributing to the formation of a relatively light yet very strong and rigid truck.

Fig. 8 illustrates diagrammatically how a single shape and size of sector element with two radial flanges thereon serves for the fabrication of all the sectors and also shows how these sectors are assembled in producing the side members of the box beams. In this figure the holes necessary to receive the tubular members 25, 26, 27 and 28 have been omitted and likewise the rectangular sections 2, 5, and 8 as well as the corresponding ones 12, 15 and 18 have been omitted and indicated merely in dotted lines as the purpose of this diagrammatic figure is merely to show the similarity of the sectors and their position of assembly.

Fig. 7 shows a single one of these sectors, all of which are substantially alike in shape and size and certain of which, as stated, differ from the remaining ones only in the positions and sizes of the holes punched therein.

It will be noted that whatever may be the angle $\theta$ of the sector member shown in Fig. 7, two such members will always cooperate properly when reversed with respect to one another, as shown for example at 3 and 4 in Fig. 8 to cause the parts to assume the proper positions for assembly. The radius R will of course be selected to correspond to the curvature of the upwardly directed flanges of the channel member 10 and the downwardly directed flanges of the channel member 20, which for convenience and cheapness in manufacture are made to agree with one another.

It will be understood that a cylindrical flange is preferably formed around each punched hole in the flat part of certain sectors, to serve as a better support for the tube which is to pass through such hole and also to provide a projecting portion for spot welding to the respective tube. An example of this is shown in Fig. 5, which shows a portion of the tube 26 passing through the flat portions of the sectors 4 and 14. Here flanges 39 are shown on the plates 4 and 14 and these serve for the spot welding as indicated at 36.

From the above description of the structure of the composite truck and the manner of assembling it, it will be clear that the latter possesses ample strength combined with great lightness. Examination of the arrangement of the sector-like plates shows that since each of them comprises a substantially flat or plane body portion, together with two radial flanges extending at right angles thereto, they are very rigid and unyielding.

The vertex of each of these sectors projects well beyond the longitudinal channel members of the box beam of which it forms a part and thus stiffens very materially the curved portions of the said beam by projecting, on the concave side, beyond each bend and practically to the center of curvature thereof.

The fact that all the sectors are of exactly the same shape and size and that they differ in only minor details, namely, the circular flanged holes which are made in some of them, makes it possible originally to fabricate all the sectors with the same press and the same set of tools and thereupon to give certain of them a subsequent treatment in a press to form the appropriate holes therein.

At all points which would otherwise be points of weakness it will be noted that reinforcing flanges or reinforcing plates are provided and these are securely held to the various parts of the truck by welding. Any kind of welding or even riveting would of course be satisfactory with certain materials, but it has been found that where the material is stainless steel spot welding is the most advantageous. The structures disclosed in the present case, therefore, are so made as to be particularly suited for spot welding, this being accomplished by having all the flanges and the like readily accessible from the outside, for the application of the welding electrodes.

It will be understood that although the underlying principles of the present invention are capable of embodiment in very many different forms, only a single preferred form has been selected for illustration herein and that therefore for an understanding of the features of novelty, attention is directed to the following claims.

I claim:

1. A composite truck comprising spaced longitudinally extending flanged members having adjacent reversely curved portions, and sector-shaped plates located adjacent to one another in pairs and secured to the flanges of both the said longitudinally extending members at their said curved portions to strengthen them, each sector-shaped plate of each pair having a flange formed along at least one radial edge thereof to stiffen it and to afford means for securing it to the adjacent sector-shaped plate.

2. A composite truck comprising spaced longitudinally extending flanged members each having a curved portion adjacent each end and intermediate pairs of adjacent reversely curved portions, sector-shaped plates located adjacent to one another in pairs and secured to the flanges of both the said longitudinally extending members at their said reversely curved portions to strengthen them, each sector-shaped plate of each pair having a flange formed along at least one radial edge thereof to stiffen it and to afford means for securing it to the adjacent sector-shaped plate, and additional sector-shaped plates secured to the curved portions of the said flanged members, adjacent the ends thereof.

3. A composite truck comprising a longitudinally extending flanged member having a curved portion, and a sector-shaped plate secured to the said longitudinally extending member along the said curved portion to strengthen it, the said sector-shaped plate having its vertex adjacent the center of curvature of the corresponding curved portion of the longitudinal member, said sector-shaped plate having an edge flange for securement to an adjacent similar plate.

4. A composite truck comprising a longitudinally extending flanged member having a curved portion, and a sector-shaped plate secured to the said longitudinally extending member along the said curved portion to strengthen it, the said sector-shaped plate having flanges along its radial edges for stiffening it and for securing it to adjacent plates, the said flanges meeting substantially at the center of curvature of the corresponding curved portion of the longitudinal member.

5. A composite truck comprising two spaced, built-up box beams each comprising vertically spaced through-running longitudinal members and sector-shaped reinforcing elements secured to the opposite sides of said through-running members, said sector-shaped elements being flanged in their margins and secured together in their flanged margins, the elements adjacent the ends of the through-running members being extended below them to form pedestal guides, these elements having braces secured thereto, the said braces extending across the truck and being secured also to the corresponding elements of the other box beam.

6. A composite truck comprising two spaced, built-up box beams each comprising vertically spaced through-running longitudinal members and sector-shaped reinforcing elements secured to the opposite sides of said through-running members, certain of said sector-shaped elements being flanged in their margins and secured together in their flanged margins, the elements adjacent the ends of the through-running members being extended below them to form pedestal guides, the elements adjacent the ends and other elements inwardly of them having braces extending therethrough, each of the said braces extending entirely across the truck, and through both box beams, and being secured to all the elements of the box beams through which it extends.

7. A composite truck comprising two spaced, built-up box beams, each comprising sector-shaped reinforcing elements, the said sector-shaped elements having sector-shaped portions projecting beyond the box beams, and tubular braces of corresponding cross sectional shape extending entirely across the truck, connecting and secured to oppositely located corresponding sector-shaped projecting portions of the sector-shaped reinforcing elements of the two box beams.

8. A composite truck comprising spaced longitudinally extending flanged members having curved portions, sector-shaped plates secured to the flanges of both the said longitudinally extending members at their said curved portions to strengthen them, rectangular plates being interposed between certain of the sector-shaped plates and secured thereto to space them apart and thus provide pedestal guides in the truck, to receive the bolster and axle boxes.

9. A composite truck as defined in claim 5, wherein a rectangular spacing plate is interposed near each end, just within the outermost sector-shaped plates, to provide a pedestal guide near each end of the truck to receive the axle boxes, and an additional rectangular spacing plate is interposed at the center of the truck between the two paired sets of sectors, to provide a slot to receive the bolster.

10. A side frame for trucks comprising vertically spaced through-running channel members extending from end to end of the frame and flat plates on the opposite sides of said channel members and secured to the side walls thereof, the edges of the adjacent plates on the same side of said channel members having overlapping flanges secured together and extending across the space between said through-running members and certain of them therebeyond to stiffen the same, the whole forming a box-section side frame structure.

11. A side frame for trucks according to claim 10 in which the through-running channel members are raised at their end portions and certain of the plates associated with said end portions are extended below the end portions and are longitudinally spaced apart in their extended portions to form pedestal guides.

12. A side frame according to claim 10 in which the through-running channel members are depressed at their central portions and certain of the plates associated with said central portions are extended above the longitudinal channel members and are longitudinally spaced apart in their extended portions to receive a bolster between them.

13. A truck construction having side frames according to claim 10, in which the through-running channel members are depressed in their central portions and certain of the plates associated with said central portions are extended above the longitudinal channel members and are spaced apart in their extended portions to receive a bolster between them, and transverse members connecting the upwardly extending portions of said plates of the opposite side frames.

14. A truck construction having side frames according to claim 10 in which the through-running channel members are raised at their end portions and certain of the plates adjacent said ends and on the opposite sides of said channel members are extended down below the channels and longitudinally spaced apart in their extended portions, and means joining together the spaced extensions on opposite sides of the channel members, said spaced extensions and the means joining them together forming pedestal guides, axle boxes guided in said pedestal guides for vertical movement, and coil springs housed for the most part by said downward extensions and supporting the truck frame from the axle boxes.

CAROLUS L. EKSERGIAN.